(12) United States Patent  
Andersson et al.

(10) Patent No.: US 9,765,908 B2  
(45) Date of Patent: Sep. 19, 2017

(54) ECCENTRIC PART OF A PIPE OR CABLE LEAD-THROUGH

(75) Inventors: Jens Andersson, Hasslö (SE); Mats Ericson, Asarum (SE); Jenny Filipsen, Karlskrona (SE); Ulf Hildingsson, Nättraby (SE); Christer Lundborg, Karlskrona (SE); Stefan Milton, Ramdala (SE); Ronnie Pettersson, Jämjö (SE); Jörgen Åkesson, Lyckeby (SE)

(73) Assignee: ROXTEC AB, Karlskrona (SE)

( * ) Notice: Subject to any disclaimer, the term of this patent is extended or adjusted under 35 U.S.C. 154(b) by 1229 days.

(21) Appl. No.: 13/138,152

(22) PCT Filed: Feb. 2, 2010

(86) PCT No.: PCT/SE2010/050122  
§ 371 (c)(1),  
(2), (4) Date: Sep. 30, 2011

(87) PCT Pub. No.: WO2010/090586  
PCT Pub. Date: Aug. 12, 2010

(65) Prior Publication Data  
US 2012/0018959 A1 Jan. 26, 2012

(30) Foreign Application Priority Data  
Feb. 4, 2009 (SE) ...................... 0950044

(51) Int. Cl.  
*F16L 5/08* (2006.01)  
*F16L 5/14* (2006.01)  
*H02G 3/22* (2006.01)

(52) U.S. Cl.  
CPC *F16L 5/08* (2013.01); *F16L 5/14* (2013.01); *H02G 3/22* (2013.01)

(58) Field of Classification Search  
USPC ............... 174/652, 654, 657; 138/106, 151; 277/654, 606, 616  
See application file for complete search history.

(56) References Cited

U.S. PATENT DOCUMENTS 649,469 A * 5/1900 McConnell .................. 138/128  
651,425 A * 6/1900 McConnell .................. 138/151  
(Continued)

FOREIGN PATENT DOCUMENTS

CN 1378715 11/2002  
DE 4405328 A1 8/1995  
(Continued)

OTHER PUBLICATIONS

Office Action for Korean Patent Application No. 10-2011-7019727 issued on May 12, 2016 and English translation thereof.

*Primary Examiner* — Kristina Fulton  
*Assistant Examiner* — L. Susmitha Koneru  
(74) *Attorney, Agent, or Firm* — Harness, Dickey & Pierce, P.L.C.

(57) ABSTRACT

A seal, lead-through or transit for cables, wires or pipes which seal, lead-through or transit has one or more compressible parts surrounding the cable, etc. and a position of an opening receiving the cable, etc. is adjustable. In one example, the opening may be placed off-center on a partition line between two module parts. In other example, an inner compressible body may be placed inside an outer compressible body or between two module parts. The inner compressible body has an opening receiving the cable, etc. which opening is placed off-center. By rotating the inner compressible body the position of the opening receiving a cable, etc. is adjusted.

10 Claims, 2 Drawing Sheets

(56) References Cited

U.S. PATENT DOCUMENTS

| | | | | |
|---|---|---|---|---|
| 2,172,429 | A * | 9/1939 | Yates | 138/152 |
| 2,790,464 | A * | 4/1957 | Stephens et al. | 285/55 |
| 3,563,825 | A * | 2/1971 | Segura | 156/187 |
| 3,798,349 | A * | 3/1974 | Thompson | H01R 4/646 174/78 |
| 4,031,312 | A * | 6/1977 | Coleman et al. | 174/542 |
| 4,259,542 | A * | 3/1981 | Tehan et al. | 174/483 |
| 4,538,021 | A * | 8/1985 | Williamson, Jr. | 174/92 |
| 4,733,016 | A * | 3/1988 | Twist et al. | 174/657 |
| 5,123,453 | A * | 6/1992 | Robbins | 138/149 |
| 5,276,280 | A * | 1/1994 | Ball | 174/652 |
| 5,286,040 | A * | 2/1994 | Gavin | 277/606 |
| 5,416,271 | A * | 5/1995 | Birmingham | F16L 5/08 174/657 |
| 5,690,147 | A * | 11/1997 | Cridland et al. | 138/149 |
| 5,697,194 | A * | 12/1997 | Gignac et al. | 52/220.8 |
| 5,711,536 | A * | 1/1998 | Meyers | 277/606 |
| 5,738,147 | A * | 4/1998 | Mestres | 138/112 |
| 5,783,776 | A * | 7/1998 | Birmingham et al. | 174/657 |
| 5,882,014 | A * | 3/1999 | Gavin | 277/602 |
| 6,376,777 | B1 * | 4/2002 | Ito et al. | 174/152 G |
| 6,390,135 | B1 * | 5/2002 | Shimizu | 138/89 |
| 6,462,275 | B1 * | 10/2002 | Daoud | 174/654 |
| 6,521,840 | B1 * | 2/2003 | Kreutz | H02G 15/013 138/109 |
| 6,555,750 | B2 * | 4/2003 | Kiely | 174/657 |
| 6,668,864 | B2 * | 12/2003 | Shimizu | 138/89 |
| 6,817,631 | B1 * | 11/2004 | Gavin | 285/139.1 |
| 6,994,355 | B2 * | 2/2006 | Brochu et al. | 277/606 |
| 7,002,077 | B2 * | 2/2006 | Pyron | 174/652 |
| 7,015,394 | B2 * | 3/2006 | Desard et al. | 174/100 |
| 7,371,969 | B2 | 5/2008 | Hedstrom | |
| 7,442,884 | B2 * | 10/2008 | Ball et al. | 174/650 |
| 8,609,990 | B2 * | 12/2013 | Levi | 174/152 G |
| 2003/0052459 | A1 * | 3/2003 | Shorey et al. | 277/603 |
| 2003/0070829 | A1 * | 4/2003 | Koessler | 174/65 G |
| 2003/0213525 | A1 * | 11/2003 | Patel et al. | 138/149 |
| 2004/0089359 | A1 * | 5/2004 | Koerner | 138/105 |
| 2004/0169341 | A1 * | 9/2004 | Hellkvist | 277/603 |
| 2005/0087934 | A1 * | 4/2005 | Richter | 277/603 |
| 2007/0199728 | A1 * | 8/2007 | Hedstrom | F16L 5/08 174/50.5 |
| 2009/0130891 | A1 * | 5/2009 | Milton | 439/373 |
| 2009/0194644 | A1 * | 8/2009 | Lundborg | 248/49 |
| 2011/0033165 | A1 * | 2/2011 | Guest | 385/138 |

FOREIGN PATENT DOCUMENTS

| | | |
|---|---|---|
| DE | 10313306 B3 | 7/2004 |
| ES | 2167149 A1 | 5/2002 |
| GB | 2186443 A | 8/1987 |
| JP | 2005-282763 A | 10/2005 |
| KR | 2006-0110320 A | 10/2006 |
| SE | WO 2008140399 A1 * | 11/2008 ............ A62C 2/065 |

* cited by examiner

ECCENTRIC PART OF A PIPE OR CABLE LEAD-THROUGH

TECHNICAL FIELD

The present invention concerns a seal, lead-through or transit for cables, pipes or wires. The invention especially concerns a compressible part or parts of the seal or transition, which part or parts is to surround a cable or pipe.

PRIOR ART

In the prior art there are cable transitions or the like having a frame, inside which a number of modules to receive cables, wires or pipes are placed. The modules are made of an elastic material e.g. rubber or plastics and are thus compressible. Inside the frame normally a number of modules are received side by side in one or more rows together with some kind of compression unit. The compression unit is placed between the frame and the modules in such a way that when the compression unit is expanded the compressible modules will be compressed around the cables, wires or pipes. For ease of description the expression "cable" is mainly used in this description, but it should be construed broadly and a person skilled in the art realises that it normally also covers pipes or wires.

Another type of seal, cable transition, pipe penetration etc. has a general cylindrical form and is to be received in a sleeve in a wall or an opening in a wall. To function in the desired way the seal should fit snugly into the sleeve or the opening of the wall in which it is received and the seal should be adaptable to the actual mounting dimension. The mounting dimension is dictated by the inner diameter of the sleeve or the opening. The seal has a cylindrical compressible body, which is compressed axially between fittings at the opposite ends of the compressible body. By the axial compression the cylindrical body will expand radially both inwards and outwards. Furthermore, the pipes or cables received may have different outer diameters, and, thus, the module should be adaptable to cables or pipes having different outer diameters.

Seals or transitions of both the above kinds are used for sealing in many different environments, such as for cabinets, technical shelters, junction boxes and machines. They are used in different industrial environments, such as automotive, telecom, power generation and distribution, as well as marine and offshore. The seals or transitions may have to seal against fluid, gas, fire, rodents, termites, dust, moisture etc., and may receive cables or wires for electricity, communication, computers etc., pipes for different gases or liquids such as water, compressed air, hydraulic fluid and cooking gas or wires for load retention.

The parts receiving a single cable etc. of both the types discussed above often have a pack of peelable layers or sheets on the inside. The layers or sheets are peeled off one-by-one until the inner diameter of the part is adapted to the outer diameter of the cable received in said part. The sheets adhere strong enough to each other to stay together and at the same time loose enough to enable the sheets to be peeled off from the stack, either one-by-one or a number of sheets together. In some embodiments there are also peelable layers or sheets on the outside, making it possible to adapt the outer dimensions of for instance a circular seal to a specific opening or sleeve.

A person skilled in the art realises that the exact shape and form of the different parts, including the layers, may vary without departing from the gist of the present invention. For example the pack of layers may have another cross sectional form than circular.

The cables etc. are normally forced to go through the middle or centre of a compressible part of the seal or transition. However, in many installations the cables are displaced from the middle of the compressible part, due to available space, the position of the cable before and after the frame etc. Depending on the type of cable used and the dimensions of it, forcing a cable, wire or pipe through the middle of a compressible part may give relatively high forces on a module, cable, wire and/or pipe. Such forces may impair the sealing effect of the seal or transition. Furthermore, if the cables or the like are forced to go through the centre of the compressible parts such as modules or seals, the risk of rupture increases.

SUMMARY

In view of the above the seals or transitions are provided with means to receive cables or pipes that are placed offset in relation to a module or seal to receive one of said cables or pipes. Thus, in many instances there is a need of being able to adapt the seal or transition to the exact position of a cable or a pipe to be received. According to one aspect of the present invention this is accomplished in that an opening of a compressible part of the seal or transition is placed eccentrically in said compressible part.

This invention may be useful when a seal is to be mounted around existing, already mounted pipes and/or cables.

Further objects and advantages of the present invention will be obvious to a person skilled in the art when reading the detailed description below of at present preferred embodiments.

BRIEF DESCRIPTION OF THE DRAWINGS

The invention will be described more closely below by way of an example and with reference to the enclosed drawings. In the drawings.

DETAILED DESCRIPTION OF EMBODIMENTS

Figure 1:
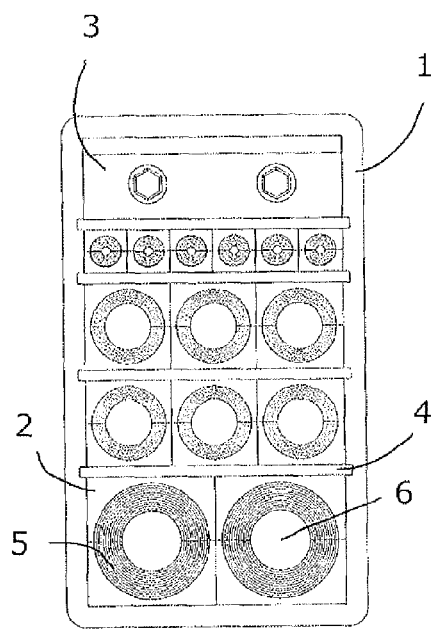
FIG. 1 is a plan view of a frame of prior art.

A common type of seals or transitions for cables and/or pipes is indicated in FIG. 1. It has an outer frame 1 received in a wall or any other type of partition. Inside the frame 1 a number of modules 2 are arranged to receive a single cable or pipe each. Furthermore, a compression unit 3 is received inside the frame 1. The modules 2 are separated by stay plates 4, arranged to position the modules 2 safely inside the frame 1. The modules 2 are compressible parts of the seal or transition. In the shown example the modules have a number of peelable sheets 5 and an appropriate number of sheets 5 are peeled off to adapt the inner diameter of the module 2 to the outer diameter of the cable or pipe to be received. Each module 2 normally has a central blind 6, which is removed when the cable or pipe is received. Thus, when a module 2 is to receive a cable or a pipe the blind 6 is first removed and then a number of sheets 5 are peeled off. When all pipes and/or cables have been placed in a module 2 each, the compression unit 3 is activated. The function of the compression unit 3 is to expand inside the frame 1. As the compression unit expands it will compress the modules 2, which are made of a compressible material such as rubber. The modules 2 will be compressed in one direction and expand in other directions, pressing the modules 2 against the frame 1.

An alternative system including a frame is described in the simultaneously filed application entitled "Sealing System", filed by the applicant of the present application. This application is hereby incorporated by reference.

Figure 2:
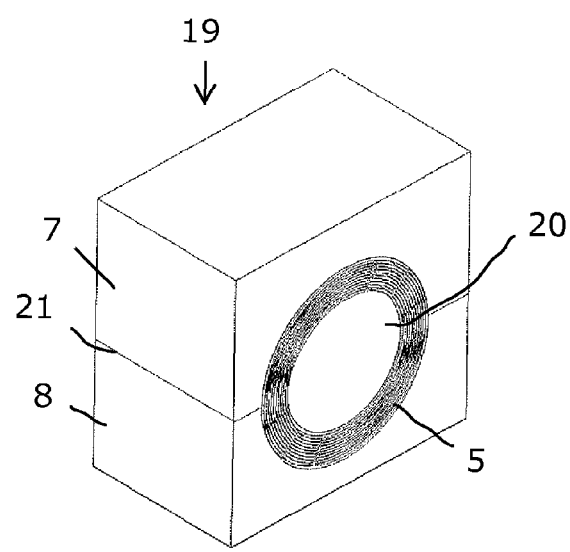
FIG. 2 is a perspective view of one example of a module according to the present invention.
Figure 3:
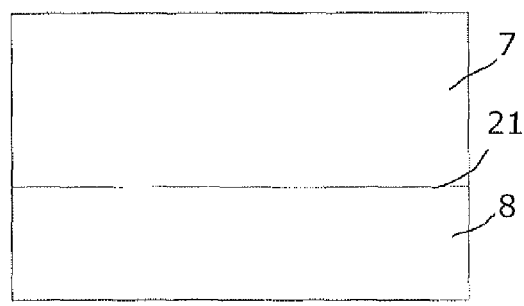
FIG. 3 is a side view of the module of FIG. 2.

In FIGS. 2 and 3 a module 19 is shown having an eccentric placed opening 20 for receiving a cable or pipe. It could also be stated as that the opening 20 is placed off-centre in the module 19. The module 19 has a first module part 7 and a second module part 8, which module parts 7, 8 have different dimensions. In the shown embodiment the upper, first module part 7 has a bigger height than the lower, second module part 8, thus a partition line 21 between the module parts 7, 8 is not placed at the middle of the module 19. When the two module parts 7, 8 are brought together a circular opening 20 is formed, inside which a set of peelable sheets 5 is placed. In the shown embodiment the opening 20 of the module 19 is not placed in the centre of the partition line 21 between the module parts 7, 8. A person skilled in the art realises that by providing a number of modules 19 with the partition line 21 between the module parts 7, 8 placed at different heights and by placing the opening 20 of the module 19 at different position along the partition line 21 between the module parts 7, 8, cables or pipes displaced in relation to the centre of the respective module 19 may be received with low stress on the different parts. To adjust the positions of each module 19 it is also possible to have peelable layers (not shown) on the outside of the module 19. The layers are then peeled off on one or more sides depending of the desired position.

The module 19 of FIGS. 2 and 3 are intended for use in a frame 1 as described in connection with FIG. 1. A person skilled in the art realises that one or more of the modules placed inside the frame may be of the type having an eccentrically placed opening, as exemplified in FIGS. 2 and 3.

Alternative embodiments of the modules are given in the simultaneously filed applications entitled "A Pipe or Cable Lead-Through having a Part Indicating Compression", "A Module of a Pipe or Cable Lead-Through having Grooves on Opposite Sides", "Pipe or Cable Lead-Through Blocks", "Modules of a Pipe or Cable Lead-Through having Alternating Geometry", "A Pipe or Cable Lead-Through having Modularized Modules", "A Pipe or Cable Lead-Through having Penetrateable Modules" and "A Pipe or Cable Lead-Through having Modules with a Dimensioning Function", filed by the applicant of the present application. In one embodiment the modules are separated from a stack of module halves sticking together, as described in the simultaneously filed application named "Modules of Pipe or Cable Lead-Through Sticking Together", filed by the applicant of the present application. These applications are hereby incorporated by reference.

In order to be able to receive a cable or pipe being displaced from the middle of a module 19 to receive the cable or pipe a number of different modules 19 are arranged. The modules may have partition lines 21 between a first and second module part 7, 8 placed at different heights. Also the openings 20 to receive the cables or pipes may be placed in different positions along the partition line 21. If in use a cable or pipe is displaced in relation to a module 19, which is to receive the cable or pipe, a module 19 having suitable positions for the partition line 21 and the opening 20 along the partition line 21 is chosen. A person skilled in the art realises that if a module 19 having an eccentrically placed opening 20 is turned 90° in either direction or 180°, it may be used for cables or pipes placed in four different cross section areas in view of the module 19. Thus, the position of the opening 20 receiving a cable or pipe is adjustable.

Figure 4:
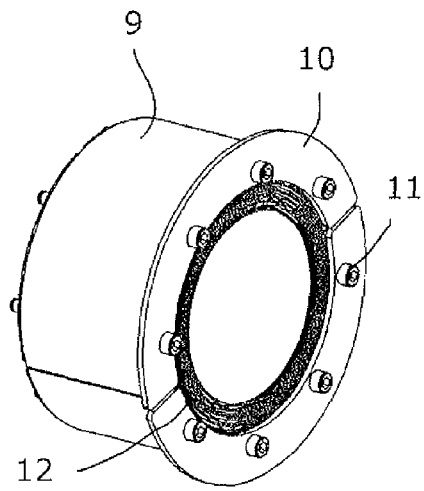
FIG. 4 is a perspective view of a cylindrical seal or transition for a cable or pipe.

In FIG. 4 a general example of a cylindrical seal or transition is showed. It has a compressible body 9 and fittings at both ends. The compressible body 9 is a compressible part of the seal or transition. Only a forward fitting 10 is visible in FIG. 4. A number of screws 11 go between the fittings and through the compressible body 9. By means of the screws 11 the fittings may be moved toward each other, compressing the compressible body 9 in axial direction, whereby the compressible body 9 will expand in radial direction, both inwards and outwards. The radial expansion of the compressible body 9 will press inwardly against a cable or pipe and outwardly against an opening or a sleeve receiving the cylindrical seal or transition. In the seal of FIG. 4 a number of peelable sheets 12 are placed on an inner diameter of the seal. A suitable number of sheets 12 are peeled off to adapt the seal or transition to a cable or pipe to be received.

Figure 5:
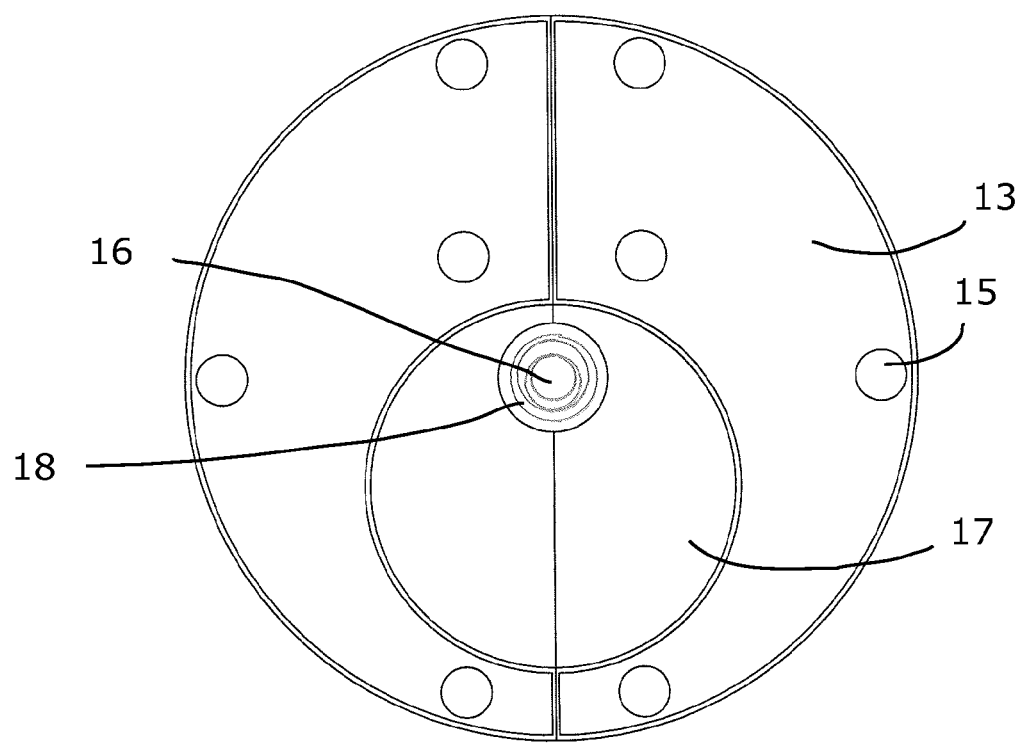
FIG. 5 is an end view of a modified seal or transition corresponding with the seal or transition of FIG. 4.
Figure 6:
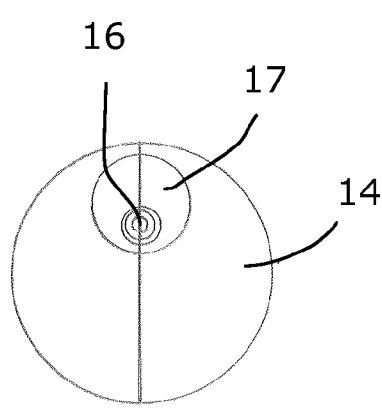
FIG. 6 is an end view of parts of the seal of FIG. 5 in a smaller scale.

In FIGS. 5 and 6 a cylindrical seal or transition is shown having a fitting 13 with an eccentrically placed opening. It should be noted that FIG. 6 is in a smaller scale than FIG. 5. In the same way as described above in connection with FIG. 4 a compressible body is placed between the shown fitting 13 and another fitting at the other end of the compressible body. The compressible body could be referred to as an outer compressible body 14 and receives an inner compressible body 17. The inner compressible body 17 is received inside an opening of the outer compressible body 14 and is placed eccentric inside the outer compressible body 14. In other embodiments (not shown) the inner compressible body may be placed in the centre of the outer compressible body. The fitting 13 has a number of openings 15 to receive compression means, such as screws, in the same manner as described in connection with FIG. 4. The outer compressible body 14 is compressed axially in that the fittings are brought closer to each other by means of the compression means. The inner compressible body 17 has a through opening 16 placed eccentrically in the outer compressible body 14. A number of peelable sheets 18 may be placed on the inside of the opening 16 of the inner compressible body 17. By rotating the outer compressible body 14 and also by rotating the inner compressible body 17 in relation to the outer compressible body 14 the opening 16 of the inner compressible body 17 may be given any desired position inside the outer periphery of the outer compressible body 14, except adjacent the outer circumference of the outer compressible body 14. Thus, the position of the opening 16 receiving a cable or pipe is adjustable. The fitting 13 has an opening, which is to be placed flush with the inner compressible body 17. Thus, the fitting 13 will be turned together with the outer compressible body 14 when said outer compressible body 14 is turned.

In other embodiments (not shown) there may be one or more through openings, for receiving a cable or pipe each, in the fitting 13 and the outer compressible body 14. Also such openings will normally have peelable sheets, in the opening of the outer compressible body 14. As stated above the fitting 13 and the outer compressible body 14 will always have the same mutual positions.

The shown cylindrical seal can be used when sealing existing cables or pipes, thus, as a retrofit. The inner and/or outer compressible bodies 14, 17 are turned to place the opening 16 of the inner compressible body 17 in position to receive the cable or pipe. The seal is relatively easy to place around a cable or pipe, as all parts of the seal are made of two separate parts brought together to form said part.

In use the inner diameter of the opening of the inner compressible body 17 is adapted to the outer diameter of a cable or pipe to be received inside the seal. Often the inner diameter of the opening of the inner compressible body 17 is adapted by peeling off an appropriate number of sheets.

Figure 7:
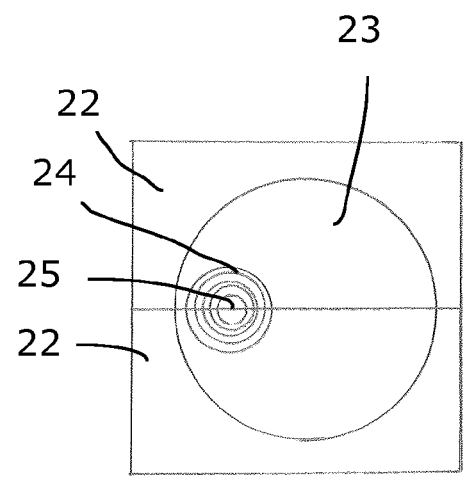
FIG. 7 is an end view of a further example of a module according to the present invention.

In FIG. 7 a further example of a module that may be received inside a frame is indicated. The module has two outer module parts 22 with recesses forming an opening for an inner compressible body 23 when the module parts 22 are brought together. Also the inner compressible body 23 is formed of two halves and forms an inner opening 25 when they are brought together. The inner opening 25 of the compressible body 23 is to receive a cable, wire or pipe and has a number of peelable sheets 24. The opening 25 receiving a cable, wire or pipe is placed eccentric (off-centre) on a partition line between the two parts forming the inner compressible body 23. By rotating the inner compressible body 23 in relation to the module parts 22 the position of the opening 25 is adjustable. In use an appropriate number of sheets 24 are peeled off, to adapt the inner diameter of the opening 25 to the outer diameter of a cable, wire or pipe received. The inner compressible body 23 is then rotated to adjust the position of the opening in relation to the position of the cable, wire or pipe. The module is normally finally placed in a frame, for instance of the type indicated in FIG. 1. Even though not shown, a module as according to FIG. 7 may have one or more further openings for receiving cables or pipes and placed on the partition line.

Even though the partition line between the module parts 22 of FIG. 7 is shown in the middle, a person skilled in the art realises that the partition line may be placed off-centre. Thus, the partition line may be placed for instance as indicated in FIGS. 2 and 3. If the partition line is placed off-centre the position of the inner compressible body 23 may be adjusted by turning the module 90° in either direction or 180°.

The sheets may be arranged in many different ways and with different features as reflected in the simultaneously filed applications entitled "A Pipe or Cable Lead-Through having Interconnected Layers", "A Pipe or Cable Lead-Through having Layers of Different Thickness", "Cohering Between Layers of a Pipe or Cable Lead-Through", "Identification of Layers of a Pipe or Cable Lead-Through" and "A Pipe or Cable Lead-Through having Layers of Alternating Geometry", filed by the applicant of the present application. These applications are hereby incorporated by reference.

In further alternative embodiments the seal, lead-through or transit of the present invention is furnished with means for lubrication as shown in the simultaneously filed application entitled "Lubrication of a Pipe or Cable Lead-Through", filed by the applicant of the present application. This application is hereby incorporated by reference.

The seal, lead-through or transit of the present invention may also have means having openings, the direction of which may be altered in order to receive cables, pipes or wires that are inclined in relation to the seal, lead-through or transit. The flexibility regarding inclined cables, pipes or wires may be accomplished in that an inner part receiving the cable etc. is received turnable inside an outer fixed part. Such an arrangement is described in the applicant's international patent application PCT/SE2008/050940.

In further embodiments the modules and/or the frame has means to give improved EMC (electromagnetic compatibility) properties. In still further embodiments the modules and/or the frame have intumescent material to increase fire resistance.

The invention claimed is:

1. A seal/transition comprising:
at least one rubber compressible part having only one opening configured to receive one cable, wire or pipe, wherein a position of the opening that receives the cable, wire or pipe is adjustable, wherein the opening is placed eccentric (off-centre) in the at least one compressible part, wherein
the at least one rubber compressible part is an inner compressible body, in which the opening receiving the cable, wire or pipe is placed eccentrically,
the inner compressible body is placed inside an outer rubber compressible body, whereby the inner compressible body may be rotated in relation to the outer compressible body in an opening in the outer rubber compressible body, and the inner compressible body is placed eccentrically in the outer rubber compressible body, and wherein
a fitting is placed at each end of the outer rubber compressible body, which fitting has first fitting openings to receive a compression device on an axial end surface of the outer rubber compressible body to compress the outer rubber compressible body in its axial direction and wherein the fitting has a second fitting opening to be placed in front of the inner compressible body.

2. The seal/transition of claim 1, wherein a number of peelable sheets are placed on the inside of the opening receiving the cable, wire or pipe.

3. The seal/transition of claim 1, wherein the at least one rubber compressible part includes a first and a second part that are separate from one another and wherein one half of the opening in the at least one rubber compressible part is formed in each of the first part and the second part such that the opening is formed on a partition line between the first and second parts when the first and second parts are brought together to form the at least one rubber compressible part.

4. The seal/transition of claim 1, wherein the inner compressible body is made in two parts such that two parts may be placed around an existing cable or pipe.

5. The seal/transition of claim 1, wherein the position of the opening that receives the cable, wire or pipe is adjustable relative to a position of the cable, wire or pipe.

6. The seal/transition of claim 1, wherein a position of an axial center of the opening that receives the cable, wire or pipe is adjustable relative to a partition line in the outer rubber compressible body.

7. The seal/transition of claim 1, wherein the outer rubber compressible body is made in two parts such that the two parts may be placed around the inner compressible body.

8. The seal/transition of claim 1, wherein the opening is surrounded by the inner compressible body and the position of the opening in the at least one rubber compressible part is rotatably adjustable within and relative to the outer rubber compressible body.

9. The seal/transition of claim 1, wherein the inner compressible body is in direct surface contact with the outer rubber compressible body.

10. The seal/transition of claim 1, wherein the inner compressible body is in direct surface contact with the outer rubber compressible body over its entire peripheral surface.

* * * * *